US011820176B2

(12) United States Patent
Ten Dam et al.

(10) Patent No.: US 11,820,176 B2
(45) Date of Patent: Nov. 21, 2023

(54) TYRE FOR AGRICULTURAL MACHINE

(71) Applicant: Apollo Tyres Global R&D B. V., Enschede (NL)

(72) Inventors: Mark Ten Dam, Tilligte (NL); Bert Kregmeier, Borne (NL); Dally Gopinath, Kerala (IN)

(73) Assignee: Apollo Tyres Global R&D B. V., Enschede (NL)

( * ) Notice: Subject to any disclaimer, the term of this patent is extended or adjusted under 35 U.S.C. 154(b) by 416 days.

(21) Appl. No.: 16/778,236

(22) Filed: Jan. 31, 2020

(65) Prior Publication Data
US 2021/0138839 A1 May 13, 2021

(30) Foreign Application Priority Data
Nov. 8, 2019 (IN) .............................. 201911045621

(51) Int. Cl.
*B60C 11/11* (2006.01)
*B60C 11/03* (2006.01)

(52) U.S. Cl.
CPC ......... *B60C 11/0311* (2013.01); *B60C 11/033* (2013.01); *B60C 2011/0313* (2013.01); *B60C 2200/08* (2013.01)

(58) Field of Classification Search
CPC ......... B60C 11/0311; B60C 2011/0313; B60C 2200/08
See application file for complete search history.

(56) References Cited

U.S. PATENT DOCUMENTS 4,131,148 A * 12/1978 Bertazzoli ........... B60C 11/0316
D12/544
4,534,392 A 8/1985 Bonko et al.
4,727,917 A 3/1988 Stewart
(Continued)

FOREIGN PATENT DOCUMENTS

CS 250929 B1 * 5/1987
EP 0743200 B1 3/2000
(Continued)

OTHER PUBLICATIONS

Machine Translation: JP-07232516-A, Iijima T, (Year: 2022).*
Machine Translation: JP-2008024270-A, Ueno Y, (Year: 2022).*
Machine Translation: CS250929B1, Racek Jaroslav, (Year: 2023).*
(Continued)

*Primary Examiner* — Kendra Ly
(74) *Attorney, Agent, or Firm* — Renner, Otto, Boisselle & Sklar, LLP

(57) ABSTRACT

A pneumatic tyre having an equatorial plane for an agricultural machine includes a tread having first lugs extending from the first lateral tread edge toward the equatorial plane, having an arcuate leading edge that arcs from the first lateral tread edge to an axial leading nose edge next to a substantially circumferential inner nose edge, and an arcuate trailing edge that arcs from the first lateral tread edge to the substantially circumferential inner nose edge; and second lugs extending from the second lateral tread edge toward the inner equatorial plane, having an arcuate leading edge that arcs from the second lateral tread edge to an axial leading nose edge next to a substantially circumferential inner nose edge, and an arcuate trailing edge that arcs from the second lateral tread edge to the substantially circumferential inner nose edge.

17 Claims, 4 Drawing Sheets

(56) References Cited

U.S. PATENT DOCUMENTS

Figure 1:
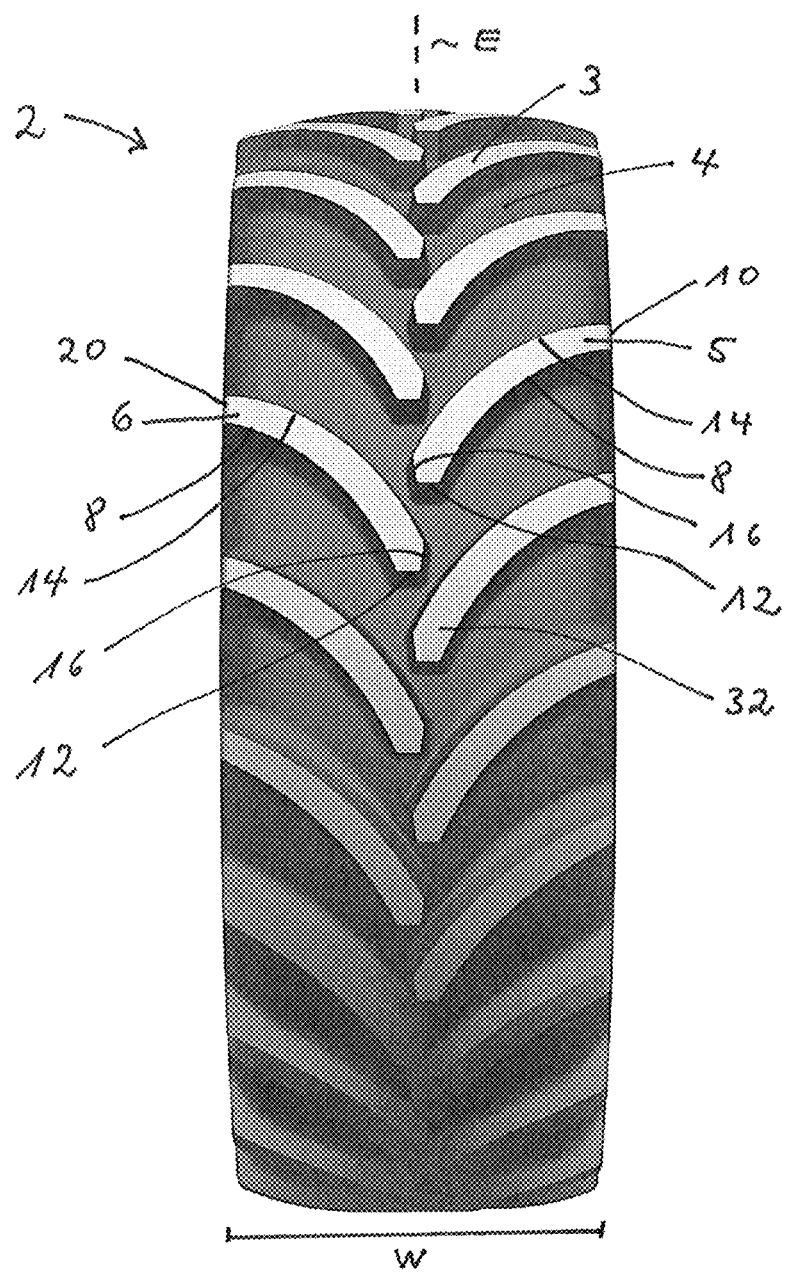

| | | | | |
|---|---|---|---|---|
| 4,791,971 | A | * | 12/1988 | Shinn ................. B60C 11/0311 152/209.12 |
| 5,056,573 | A | * | 10/1991 | O'Brien ............. B60C 11/0311 152/209.12 |
| 5,337,814 | A | | 8/1994 | Bonko |
| 5,733,394 | A | * | 3/1998 | Baus ................. B60C 11/0318 152/208 |
| 6,179,027 | B1 | * | 1/2001 | Shimizu ............. B60C 11/0311 152/209.12 |
| 9,764,597 | B2 | | 9/2017 | Harris et al. |
| 2004/0118497 | A1 | * | 6/2004 | Bonko ................. B60C 11/033 152/209.12 |
| 2006/0124215 | A1 | * | 6/2006 | Vu ....................... B60C 1/0016 152/209.12 |
| 2013/0292019 | A1 | * | 11/2013 | Vervaet ................ B60C 11/033 152/209.18 |

FOREIGN PATENT DOCUMENTS

| | | | | |
|---|---|---|---|---|
| EP | 3027430 | B1 | | 6/2017 |
| EP | 2661377 | B1 | | 9/2017 |
| EP | 3212443 | A1 | | 9/2017 |
| JP | 02204107 | A | * | 8/1990 |
| JP | 07232516 | A | * | 9/1995 |
| JP | 2008024270 | A | * | 2/2008 ......... B60C 11/0316 |
| WO | 2015158871 | A1 | | 10/2015 |
| WO | 2016070105 | A1 | | 5/2016 |
| WO | 2017/072014 | A1 | | 5/2017 |

OTHER PUBLICATIONS

Machine Translation: JP-02204107-A, Ichikawa T, (Year: 2023).*
German Patent Office Search Report for corresponding Application No. 20 2020 100 216.3 dated May 4, 2020.

* cited by examiner

Fig. 2

TYRE FOR AGRICULTURAL MACHINE

The invention relates to a tyre and tread for agricultural machines.

Agricultural tyres are designed to operate on road and field conditions. Comfort regarding vibrations and noise of the driver is one of the important requirements of the tyre when operating in road conditions. In the field the tyres need to operate in wet or dry soils, with varying soil structures such as clay, sand and stones. Traction is one of the requirements needed for all operations in the field. Both, the road and field requirements need to be combined in one tread design.

One structure that can fulfill both requirements is a curved lug design, which will generate traction by placing the shoulders of the lug perpendicular to the bead and generate comfort by placing the center of the lug parallel to the bead. A curvature in the lug will connect the shoulder and center area of the lug also denoted nose. In this way the requirements for both the field and road can be fulfilled.

U.S. Pat. No. 9,764,597 B2 describes a pneumatic agricultural tire having a tread having first and second lugs on a first and second side of the tire extending from a first lateral tread edge toward an equatorial plane, wherein the lugs have an arcuate leading edge that arcs from the lateral tread edge to a substantially axial leading nose edge, and an arcuate trailing edge that arcs from the lateral tread edge to a substantially circumferential inner nose edge.

WO 2017 072014 A1 describes a tread for agricultural tire comprising a plurality of lugs protruding from the ground of the tread in radially outer direction extending at a given inclination angle from a central portion of the tread toward both axial ends of the tread and alternately arranged at given intervals in the circumferential direction on one side and on the other with respect to the equatorial plane of the tire. The lugs comprising a stepping-in surface wherein the stepping-in surface of at least one lug comprises on its sidewall a first, radially outer, concave surface and a second, radially inner, concave surface intersecting each other in a transition point (D) when viewed in a circumferential section.

EP 3 027 430 B8 describes a tire with improved traction, wherein a tread has a plurality of ribs, each rib being provided with a front wall and a rear wall, wherein the rib on the front wall has a shaped profile.

EP 0 743 200 B1 describes an agricultural tire with a pitched tread having an annular tread with two sets of lugs wherein the tire has a reduced lug vibration. The tread is divided into a plurality of circumferentially repeating design cycles of at least two, preferably three distinct design cycle lengths.

EP 3 212 443 A1 describes tyre treads with tread elements with inclined lateral sides.

EP 2 661 377 B1 describes a tire for a multipurpose agricultural machine comprising a tread comprising a plurality of lugs, wherein each lug comprising a leading lateral face, a trailing lateral face, an axially outer end face, an axially inner end face and a contact face. The lugs are distributed in first and second row of lugs consisting of an alternation of long lugs and short lugs.

In general the tyres perform well on traction, but less on the comfort requirements, especially on vibrations. Furthermore these designs are more sensible to undesirable wear patterns. There is a permanent need providing tyre treads for agricultural machines with improved wear resistance and comfort for the driver and good traction properties.

It is an object of the invention providing a tyre for an agricultural machine with improved wear resistance and comfort for the driver and maintaining good traction properties.

The object is accomplished by a tyre for an agricultural machine according to claim 1. Preferred embodiments of the invention are given by the dependent claims, which can constitute each solely or in combination an aspect of the invention.

According to the invention a pneumatic tyre having an equatorial plane (E) for an agricultural machine, comprising:
- a tread having a first and a second lateral tread edge, the axial distance between the first and second lateral tread edges being the width of the tread (W), wherein the tread comprises a plurality of lugs extending radially between an inner surface of the tread and a tread surface to come into contact with the ground; and
- first lugs extending from the first lateral tread edge toward the inner equatorial plane (E), having a shoulder portion extending from the first lateral tread edge and a nose portion at the inner equatorial plane (E), and each of the first lugs having:
    - an arcuate leading edge that arcs from the first lateral tread edge to an axial leading nose edge next to a substantially circumferential inner nose edge, and an arcuate trailing edge that arcs from the first lateral tread edge to the substantially circumferential inner nose edge; and
- second lugs extending from the second lateral tread edge toward the inner equatorial plane (E), having a shoulder portion extending from the second lateral tread edge and a nose portion at the inner equatorial plane (E), and each of the second lugs having:
    - an arcuate leading edge that arcs from the second lateral tread edge to an axial leading nose edge next to a substantially circumferential inner nose edge, and an arcuate trailing edge that arcs from the second lateral tread edge to the substantially circumferential inner nose edge,
    - wherein for each lug the length of the substantially circumferential inner nose edge is longer than the length of the axial inner nose edge and the width (L) of said lug increases from the corresponding shoulder portion to the nose portion of said lug.

The widening surface of the nose portion of the lug in the center of the tread provides consistent contact of the lug surface with the road and improves the comfort for the user on hard surfaces. Particularly, a significant reduction in the in-cabin noise when driving a tractor at 40 km/h or 50 km/h can be provided. For example testing results showed 29% lower in-cabin noise with respect to a reference. Further, the tread achieves better wear performance. Particularly, the tread avoids undesirable wear patterns arising from hard road conditions.

In embodiments, the tyre tread has n lugs which $38 \leq n \leq 46$. It is assumed that the resulting number of pitches achieves a good tradeoff between wear and traction of the tyre on soils.

Further, the lug/pitch design can provide for a reduced variation of the centroid, for example from 15% to about 9%, in simulations.

In embodiments, the size ratio of the tread surface a to the total surface of tread surface a and inner surface b is in a range a/(a+b) of $\geq 20\%$ to $\leq 32\%$, preferably of $\geq 24\%$ to $\leq 27\%$. The ratio a/(a+b) may be in a range of $\geq 25\%$ to $\leq 26\%$.

In embodiments, an angle α of a straight line (D), which passes through an inner nose tip (I) that is the crossing point of the axial leading nose edge and the equatorial plane (E) and an laterally outer end point (II) of the arcuate leading edge, relative to the equatorial plane (E), is in a range from 46≤α≤50°. The angle α preferably is 49.5°. The angle α improves the distribution of the lugs.

In embodiments, an angle β of a tangent ($t_e$) to the arcuate leading edge at the lateral tread edge, relative to an axial line (A), is up to 20°. The angle β determines the starting angle of the lug radius. The arc between the nose tip leading edge and the shoulder is defined by this angle. An angle β of or below 20° provides that the traction is maintained while the lug tearing resistance is improved.

In embodiments, the lug width (L) at the lateral edge of the lug is in a range from ≥41 mm to ≤50 mm. In embodiments, the lug width (L) of the lug is in a range of ≥7.5% to ≤8.5% of the tread width (W). A shoulder wide of about 41-50 mm or 7.5-8.5% of the tread width provides for a good balance between support, ground penetration and traction. The lug width (L) at the nose portion may be in a range from ≥46 mm to ≤57 mm.

In embodiments, the length of the substantially circumferential inner nose edge is in a range from ≥1.1 to ≤1.4 times, preferably from ≥1.1 to ≤1.3 times, or from ≥1.2 to ≤1.3 times, the length of the axial inner nose edge. Such ratio can reduce peak pressure on the nose and improve the comfort for the driver.

In embodiments, the length of the substantially circumferential inner nose edge is in a range from ≥36 mm to ≤45 mm.

In embodiments, the gap (g) between the trailing edge of a first lug and the nose tip of a following lug which follows the first lug in circumferential direction, is in a range from ≥25 mm to ≤45 mm, preferably in a range from ≥32 mm to ≤40 mm. Such gap dimensions provide for maintaining good traction of the tyre on soft ground.

In embodiments, the radius of the arcuate leading edge is in a range of ≥75% to ≤80% of the tread width (W) and/or the radius of the arcuate trailing edge is in a range of ≥75% to ≤90% of the tread width (W).

Figure 3:
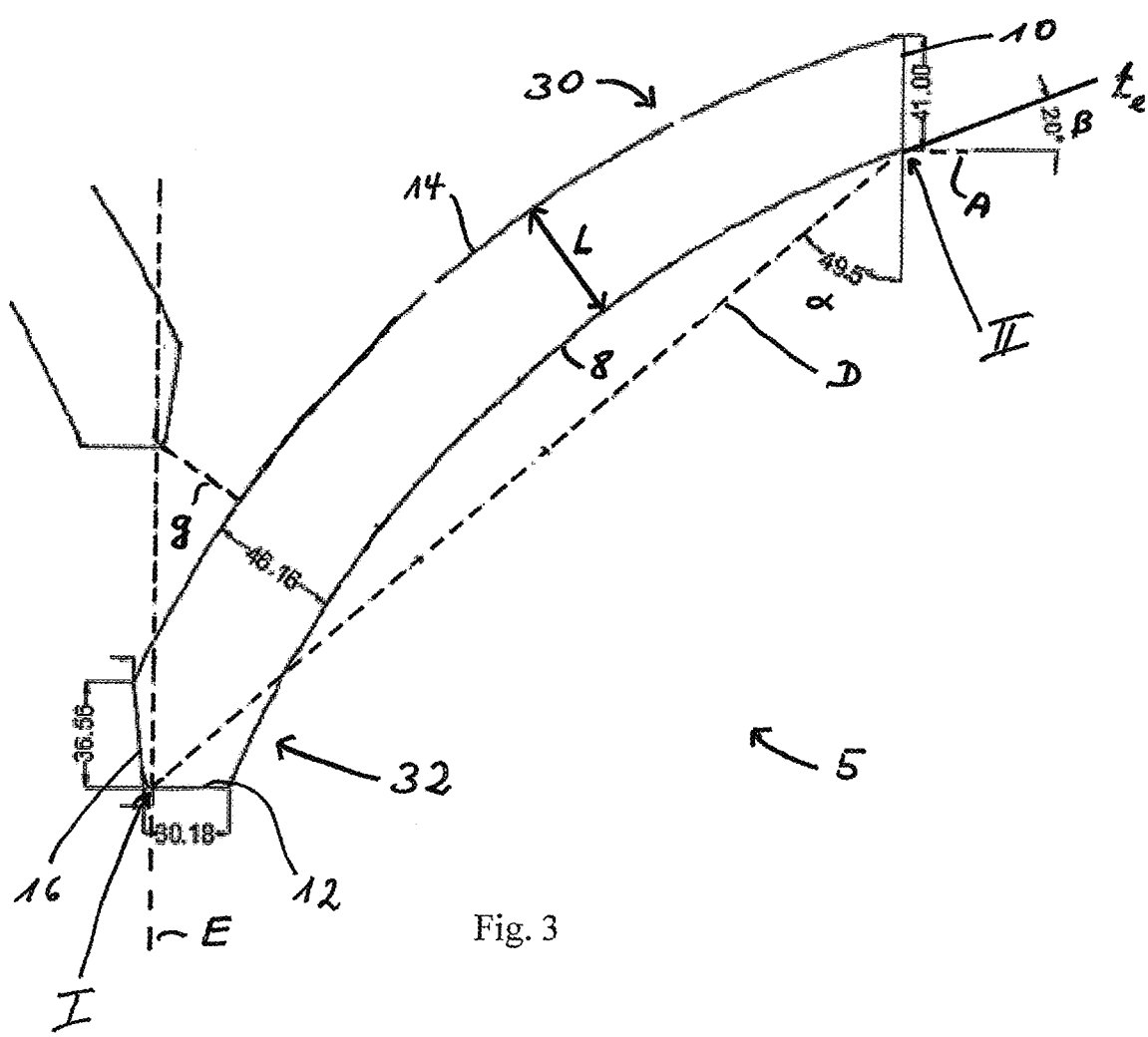
Figure 4:
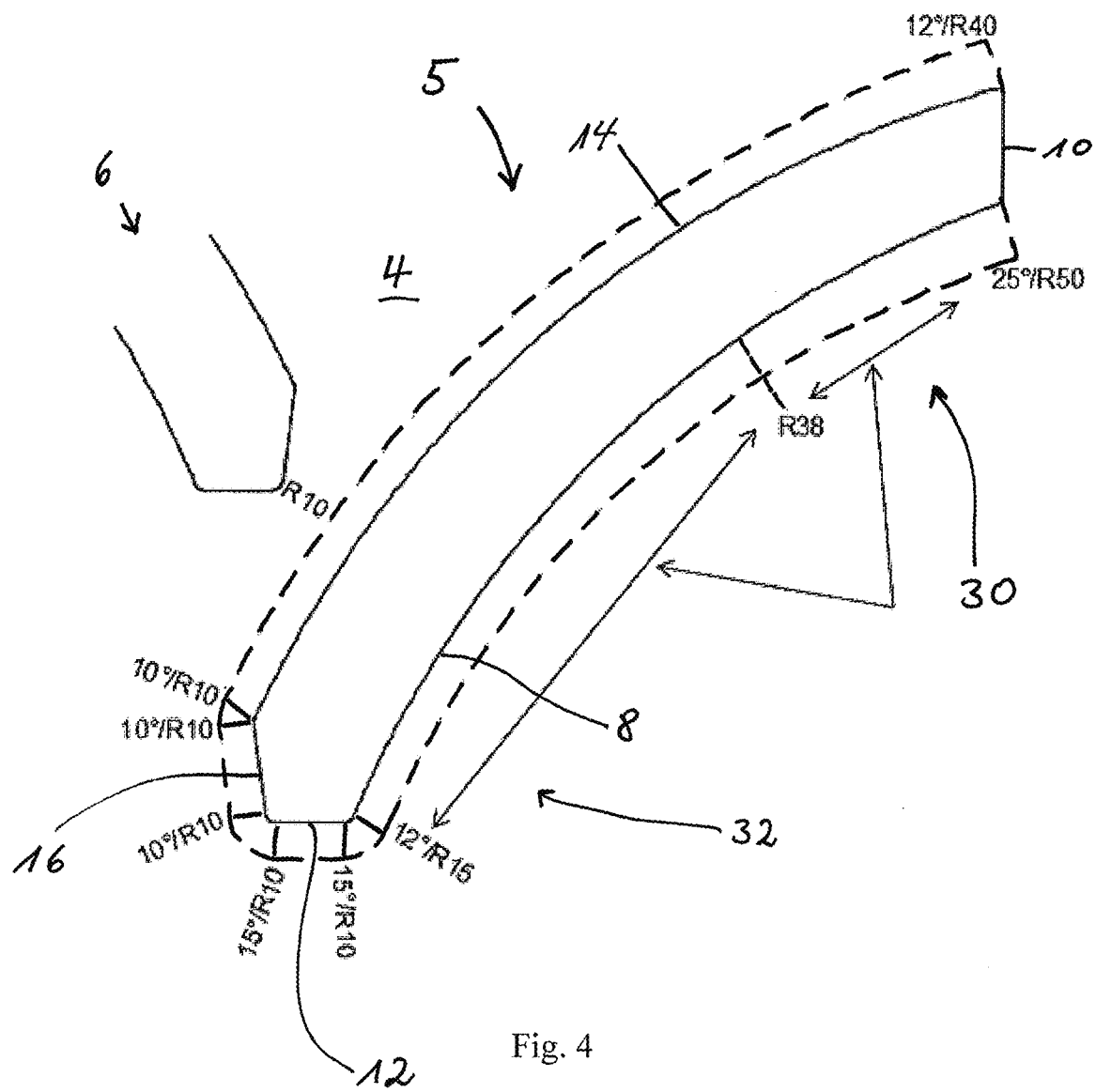

In the following the invention is explained in detail by example with reference to the enclosed drawings showing preferred embodiments of the present invention, wherein each feature can constitute solely or in combination an aspect of the invention. In the drawings:

FIG. 1: is a schematic view of a tyre tread for an agricultural machine,

Figure 2:
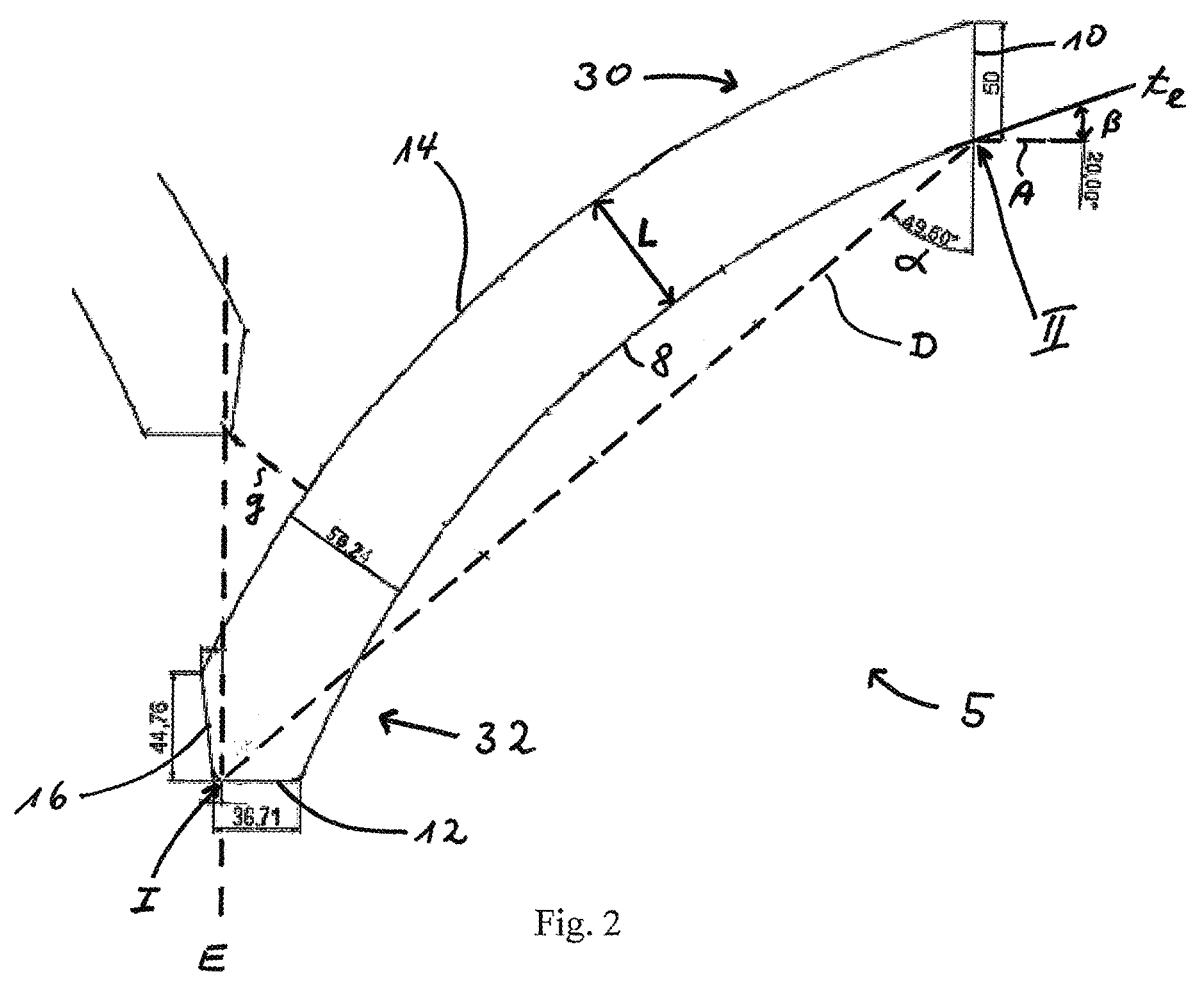

FIG. 2: is a schematic view of a lug of a tread for an agricultural tyre of 650/65 R 42 dimension, FIG. 3: is a schematic view of a lug of a tread for an agricultural tyre of 540/65 R 30 dimension, FIG. 4: is a further schematic view of a lug of a tread for an agricultural tyre of 650/65 R 42 dimension.

The pneumatic tyre having an equatorial plane E for an agricultural machine as illustrated in FIG. 1 comprises a tread 2 having a first lateral tread edge 10 and a second lateral tread edge 20. The axial distance between the first and second lateral tread edges 10 and 20 is the width of the tread W. The tread 2 comprises a plurality of lugs 5 and 6 extending radially between an inner surface 4 of the tread 2 and a tread surface 3 that is to come into contact with the ground. The tread 2 comprises first lugs 5 extending from the first lateral tread edge 10 toward the inner equatorial plane E. The lugs 5 have a shoulder portion 30 extending from the first lateral tread edge 10 and a nose portion at the inner equatorial plane E. Each of the first lugs 5 has an arcuate leading edge 8 that arcs from the first lateral tread edge 10 to an axial leading nose edge 12 next to a substantially circumferential inner nose edge 16, and an arcuate trailing edge 14 that arcs from the first lateral tread edge 10 to the substantially circumferential inner nose edge 16. Second lugs 6 extend from the second lateral tread edge 20 toward the inner equatorial plane E. The second lugs 6 also have a shoulder portion 30 extending from the second lateral tread edge 20 and a nose portion at the inner equatorial plane E. Each of the second lugs 6 has an arcuate leading edge 8 that arcs from the second lateral tread edge 20 to an axial leading nose edge 12 next to a substantially circumferential inner nose edge 16, and an arcuate trailing edge 14 that arcs from the second lateral tread edge 20 to the substantially circumferential inner nose edge 16.

For each lug 5 and 6 the length of the substantially circumferential inner nose edge 16 is longer than the length of the axial inner nose edge 12 and the width L of said lug increases from the corresponding shoulder portion 30 to the nose portion 32 of said lug 5 and 6.

In the following different embodiments for the lug 5 of the tread 2 are described. Illustrated in FIG. 2 is the lug for an agricultural tyre of 650/65 R 42 dimension. Illustrated in FIG. 3 is the lug for an agricultural tyre of 540/65 R 30 dimension. Such treads may comprise 46 or 38 lugs, respectively.

The lug 5 shown in FIG. 2 has an arcuate leading edge 8 that arcs from the lateral tread edge 10 to the axial leading nose edge 12, and an arcuate trailing edge 14 that arcs from the lateral tread edge 10 to the substantially circumferential inner nose edge 16. The lug width L at the lateral tread edge 10 is 50 mm and increases to about 56 mm at the nose portion 32 of the lug. A straight line D passes through an inner nose tip I that is the crossing point of the axial leading nose edge 12 and the equatorial plane E and an laterally outer end point II of the arcuate leading edge 8 and provides an angle α of the line D relative to the equatorial plane E of 49.50°. A tangent $t_e$ to the arcuate leading edge 8 of the lug at the lateral tread edge 10, relative to an axial line A forms an angle β that is 20°. The length of the substantially circumferential inner nose edge 16 of 44.76 mm is about 1.2 times the length of the axial inner nose edge 12 of 36.71 mm.

The lug 5 shown in FIG. 3 also has an arcuate leading edge 8 and an arcuate trailing edge 14. The lug width L at the lateral tread edge 10 is 41 mm and increases to about 46 mm at the nose portion 32 of the lug. A straight line D passes through an inner nose tip I that is the crossing point of the axial leading nose edge 12 and the equatorial plane E and an laterally outer end point II of the arcuate leading edge 8 and provides an angle α of the line D relative to the equatorial plane E of 49.50°. A tangent $t_e$ to the arcuate leading edge 8 of the lug at the lateral tread edge 10, relative to an axial line A forms an angle β that is 20°. The length of the substantially circumferential inner nose edge 16 of 36.56 mm is about 1.2 times the length of the axial inner nose edge 12 of 30.18 mm.

FIG. 4 is a further schematic view of a lug of a tread for an agricultural tyre of 650/65 R 42 dimension. FIG. 4 illustrates that the lug tapper at the trailing edge 14 near the shoulder is 12°. The lug tapper angle at the axial leading nose edge 12 and the circumferential inner nose edge 16 is 15° and 10°, respectively. Thus a gap between the lugs at the nose centre is reduced. The lug base radius at the arcuate leading edge 8 gradually varies from the nose portion to the shoulder portion 32 in two parts, first from 15 mm to 38 mm and second from 38 mm to 50 mm.

REFERENCE SIGNS 2 tread
3 tread surface
4 inner surface
5 first lug
6 second lug
8 arcuate leading edge
10 first lateral tread edge
12 axial leading nose edge
14 arcuate trailing edge
16 substantially circumferential inner nose edge
20 second lateral tread edge
30 shoulder portion
32 nose portion

The invention claimed is:

1. A pneumatic tyre for an agricultural machine, the tyre having an equatorial plane, the tyre comprising:
    a tread having a first and a second lateral tread edge, the axial distance between the first and second lateral tread edges being the width of the tread, wherein the tread comprises a plurality of lugs extending radially between an inner surface of the tread and a tread surface to come into contact with the ground; and
    first lugs extending from the first lateral tread edge toward the equatorial plane, having a shoulder portion extending from the first lateral tread edge and a nose portion at the equatorial plane, and each of the first lugs having:
an arcuate leading edge that has a first radius and that arcs from the first lateral tread edge to an axial leading nose edge next to a substantially circumferential inner nose edge, and an arcuate trailing edge that has a second radius different than the first radius and that arcs from the first lateral tread edge to the substantially circumferential inner nose edge; and
    second lugs extending from the second lateral tread edge toward the equatorial plane, having a shoulder portion extending from the second lateral tread edge and a nose portion at the equatorial plane, and each of the second lugs having:
    an arcuate leading edge that has a third radius and that arcs from the second lateral tread edge to an axial leading nose edge next to a substantially circumferential inner nose edge, and an arcuate trailing edge that has a fourth radius different than the third radius and that arcs from the second lateral tread edge to the substantially circumferential inner nose edge,
    wherein for each lug the length of the substantially circumferential inner nose edge is longer than the length of the axial inner nose edge and the width of said lug between the arcuate leading edge and the arcuate trailing edge increases along the lug from the corresponding shoulder portion to the nose portion of said lug, and
    wherein for each lug an angle α of a straight line, which passes through an inner nose tip that is the crossing point of the axial leading nose edge and the equatorial plane and a laterally outer end point of the arcuate leading edge, relative to the equatorial plane, is in a range from $46° \leq \alpha \leq 50°$.

2. The tyre according to claim 1, wherein the tread has n lugs which $38 \leq n \leq 46$.

3. The tyre according to claim 1, wherein the size ratio of the tread surface a to the total surface of tread surface a and inner surface b is in a range a/(a+b) of $\geq 20\%$ to $\leq 32\%$.

4. The tyre according to claim 1, wherein an angle β of a tangent ($t_e$) to the arcuate leading edge at the lateral tread edge, relative to an axial line, is up to 20°.

5. The tyre according to claim 1, wherein the lug width at the lateral edge of the lug is in a range from $\geq 41$ mm to $\leq 50$ mm.

6. The tyre according to claim 1, wherein the lug width of the lug is in a range of $\geq 7.5\%$ to $\leq 8.5\%$ of the tread width.

7. The tyre according to claim 1, wherein the length of the substantially circumferential inner nose edge is in a range from $\geq 1.1$ to $\leq 1.4$ times, the length of the axial inner nose edge.

8. The tyre according to claim 1, wherein the length of the substantially circumferential inner nose edge is in a range from $\geq 36$ mm to $\leq 45$ mm.

9. The tyre according to claim 1, wherein the gap between the trailing edge of a first lug and the nose tip of a following lug which follows the first lug in circumferential direction, is in a range from $\geq 25$ mm to $\leq 45$ mm.

10. The tyre according to claim 1, wherein the size ratio of the tread surface a to the total surface of tread surface a and inner surface b is in a range a/(a+b) of $\geq 24\%$ to $\leq 27\%$.

11. The tyre according to claim 1, wherein an angle α of a straight line, which passes through an inner nose tip that is the crossing point of the axial leading nose edge and the equatorial plane and an laterally outer end point of the arcuate leading edge, relative to the equatorial plane, is 49.5°.

12. The tyre according to claim 1, wherein the length of the substantially circumferential inner nose edge is in a range from $\geq 1.2$ to $\leq 1.3$ times, the length of the axial inner nose edge.

13. The tyre according to claim 1, wherein the gap between the trailing edge of a first lug and the nose tip of a following lug which follows the first lug in circumferential direction, is in a range from $\geq 32$ mm to $\leq 40$ mm.

14. The tyre according to claim 1, wherein the tread consists of the first lugs and the second lugs.

15. The tyre according to claim 1, wherein the angle α is in a range from $46° \leq \alpha \leq 49.5°$.

16. The tyre according to claim 15, wherein the tread consists of the first lugs and the second lugs.

17. A pneumatic tyre for an agricultural machine, the tyre having an equatorial plane, the tyre comprising:
    a tread having a first and a second lateral tread edge, the axial distance between the first and second lateral tread edges being the width of the tread, wherein the tread comprises a plurality of lugs extending radially between an inner surface of the tread and a tread surface to come into contact with the ground; and
    first lugs extending from the first lateral tread edge toward the equatorial plane, having a shoulder portion extending from the first lateral tread edge and a nose portion at the equatorial plane, and each of the first lugs having:
an arcuate leading edge that has a first radius and that arcs from the first lateral tread edge to an axial leading nose edge next to a substantially circumferential inner nose edge, and an arcuate trailing edge that has a second radius different than the first radius and that arcs from the first lateral tread edge to the substantially circumferential inner nose edge; and
    second lugs extending from the second lateral tread edge toward the equatorial plane, having a shoulder portion extending from the second lateral tread edge and a nose portion at the equatorial plane, and each of the second lugs having:

an arcuate leading edge that has a third radius and that arcs from the second lateral tread edge to an axial leading nose edge next to a substantially circumferential inner nose edge, and an arcuate trailing edge that has a fourth radius different than the third radius and that arcs from the second lateral tread edge to the substantially circumferential inner nose edge, wherein for each lug the length of the substantially circumferential inner nose edge is longer than the length of the axial inner nose edge and the width of said lug between the arcuate leading edge and the arcuate trailing edge increases along the lug from the corresponding shoulder portion to the nose portion of said lug, and wherein the radius of the arcuate leading edge is in a range of ≥75% to ≤80% of the tread width and/or the radius of the arcuate trailing edge is in a range of ≥75% to ≤90% of the tread width.

\* \* \* \* \*